Sept. 30, 1958 A. NYMAN 2,854,509
FACSIMILE OPTICAL SCANNING APPARATUS
Original Filed Aug. 4, 1951 3 Sheets-Sheet 1
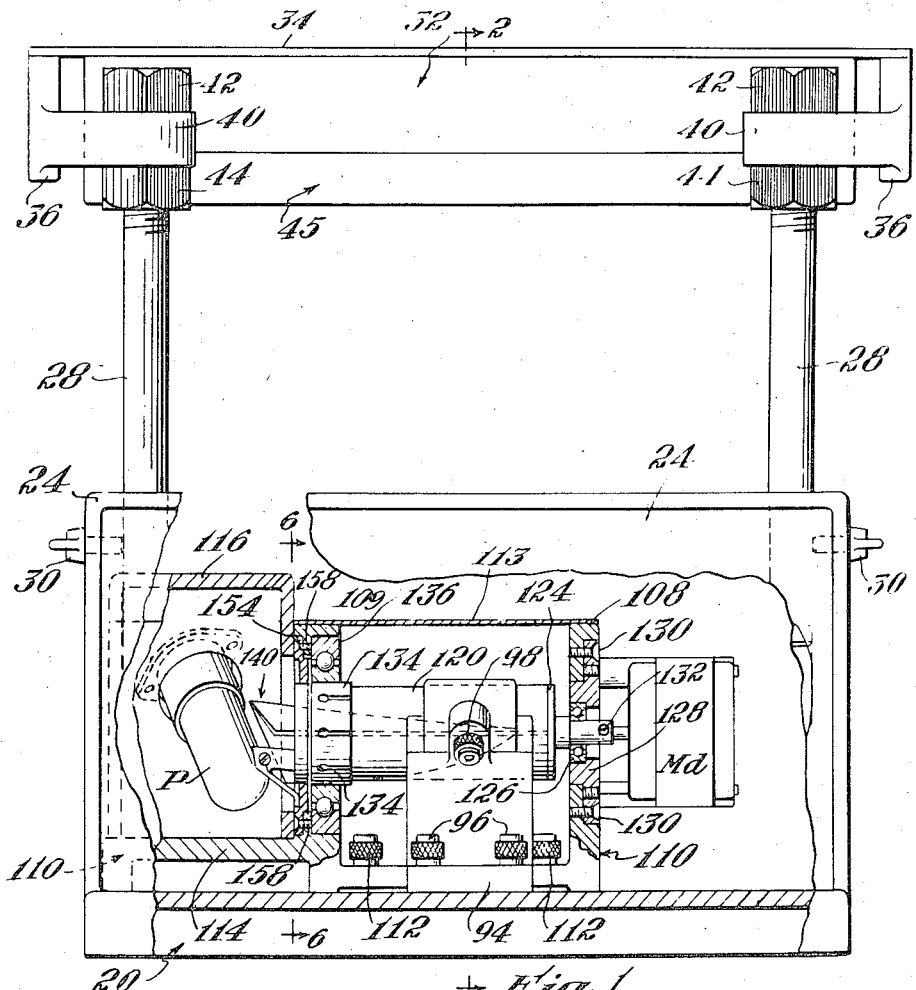
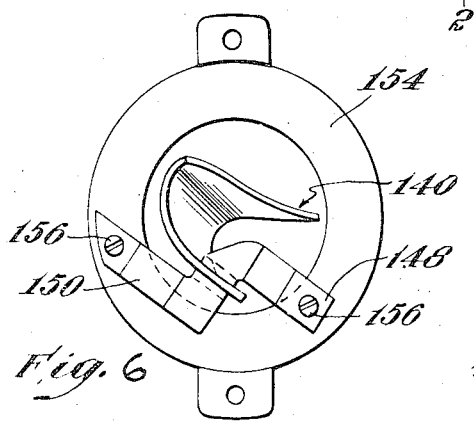
Fig. 6
Inventor
Alexander Nyman
by Roberts, Cushman & Grover
attys.

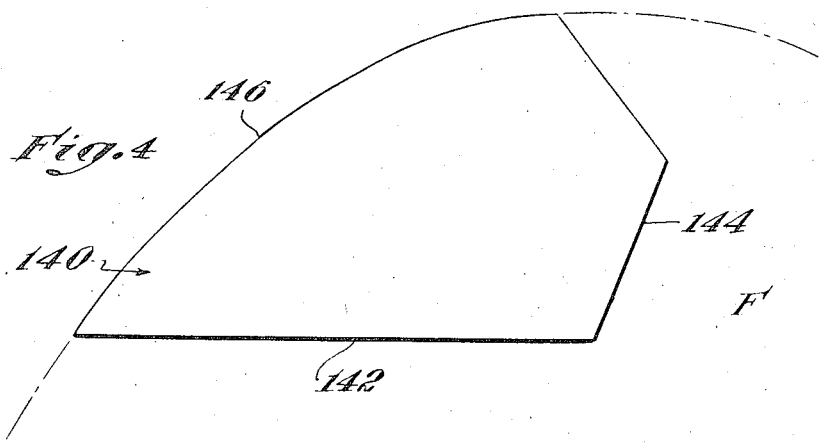
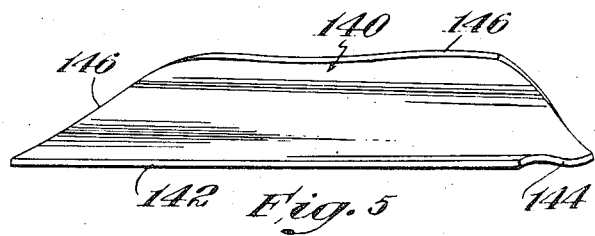
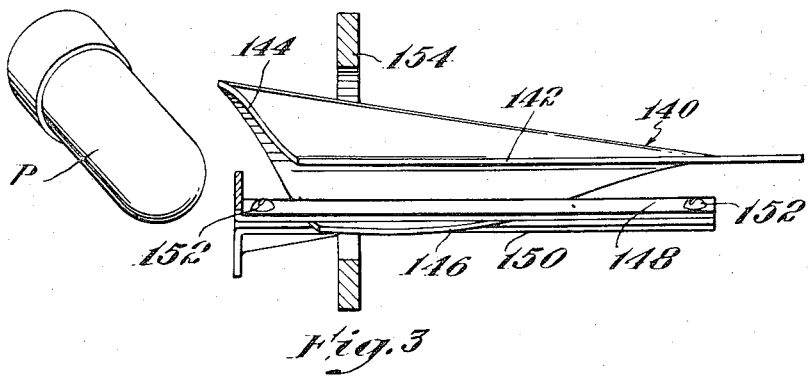

United States Patent Office 2,854,509
Patented Sept. 30, 1958

2,854,509

FACSIMILE OPTICAL SCANNING APPARATUS

Alexander Nyman, Dover, Mass., assignor to Alden Products Co., Brockton, Mass., a corporation of Massachusetts Original application August 4, 1951, Serial No. 240,418. Divided and this application February 12, 1953, Serial No. 336,499

3 Claims. (Cl. 178—7.6)

This invention relates to an optical system for directing the course of light from one location to another and more particularly to apparatus for scanning a sheet of indicia or other subject copy.

Objects of the invention are to provide optical apparatus which directs light from one course to another without the loss of much of the light and to provide such apparatus which is compact and can be encompassed in a restricted space.

In one aspect the present invention involves a light conductor in the form of a plate of light conducting material having a high index of refraction, the plate having a light-entering edge to receive light, a light-emerging edge angularly related to the light-entering edge, and an intermediate elliptical reflecting edge. In the preferred embodiment the plate is folded and the radius of curvature of the fold is such that the angle of incidence of the internally-reflected light exceeds the critical angle of the material.

In a more specific aspect the invention involves optical scanning apparatus comprising a light-sensitive device responsive to variations in light intensity, together with means for scanning the copy point by point including a lens for focusing the scanning light of the device and a plate of light conducting material having a high index of refraction, the plate having a light-entering edge facing the lens to receive the light focused thereby, a light-emerging edge angularly related to the light-entering edge and an intermediate elliptical reflecting edge having one focus at the lens and the other focus at the device.

In a still more specific aspect of the invention the optical system includes a drum having a helically shaped aperture and a plate having a linear aperture arranged parallel to the axis of the drum adjacent the periphery thereof, the aforesaid apertures being interposed in the optical path of the light rays between the copy and the light-sensitive device, and means for rotating the drum so that selected elemental areas of the copy whose dimensions are determined by the apertures are successively imaged upon the device, the aforesaid plate being disposed within the drum with its light-entering edge facing said linear aperture and its light-emerging edge facing one end of the drum and the aforesaid device being located outside said end of the drum.

For the purpose of illustration a typical embodiment of the invention is shown in the accompanying drawings in which, Fig. 1 is a side elevation view with portions broken away of a preferred embodiment of an optical scanner;

Fig. 3 is a fragmentary isometric view showing the relationship of the photoelectric cell and the light conductor;

Fig. 4 is a developed view of the light conductor;

Fig. 5 is a side view of the light conductor, and

Fig. 6 is a fragmentary end view of the light conductor.

Figure 2:
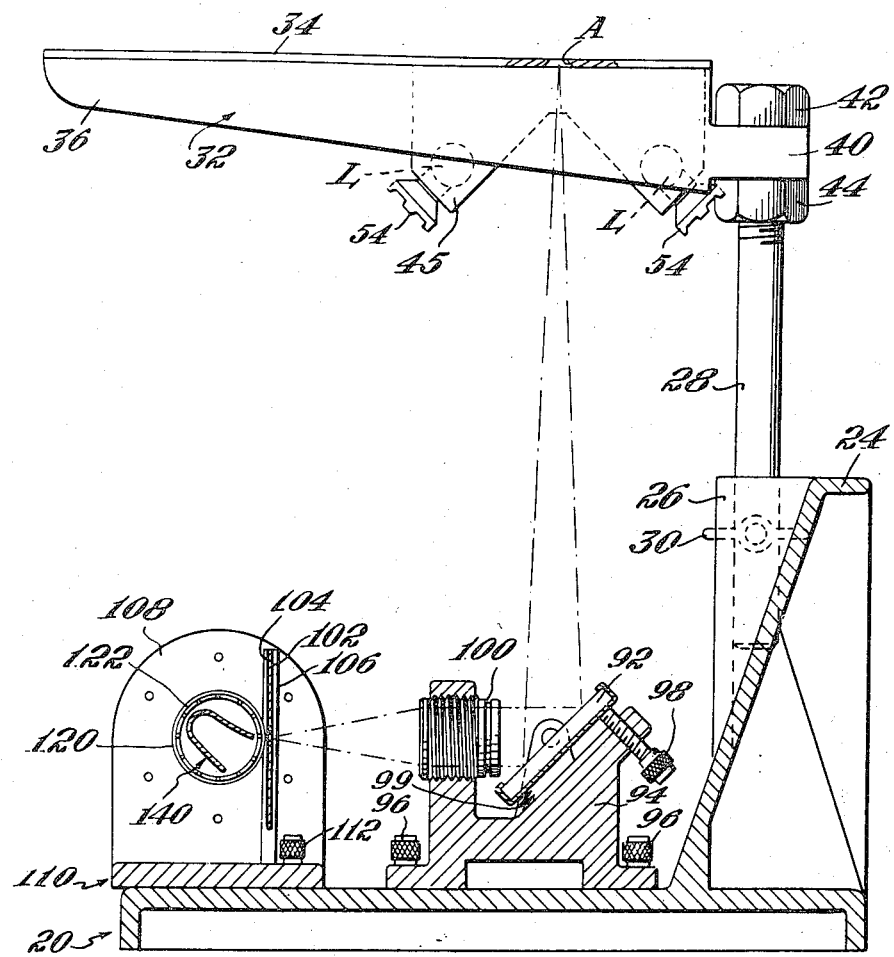
Fig. 2 is a sectional view on line 2—2 of Fig. 1.

As is best shown in Figs. 1 and 3 the embodiment of the optical scanner chosen for the purposes of illustration is supported upon a base 20 having a bracket 24 cast integrally therewith so that the bracket extends upwardly from the rear of the base. The bracket 24 has bosses 26 positioned at either end thereof wherein are carried respectively two vertically disposed columns 28 which telescope in apertures in the bosses being secured in adjusted position by means of thumb screws 30.

Upon the upper ends of the columns 28 is carried a copy table 32, which has an upper copy guiding surface 34, each side of which is reinforced by a respective rib 36. At the rear end of each rib 36 is an integrally cast finger or tab 40 which is turned inwardly and provided with an aperture for engaging the upper end of a respective column 28. The table 32 is held in position by two pairs of nuts 42 and 44 which engage threads cut in the ends of the columns 28 so that nuts are positioned respectively above and below the tabs 40. As is shown in Fig. 2, the surface 34 of the copy table 32 is provided with a transverse slot A and is brightly illuminated from the bottom of the table by light from two tubular electric lamps L (Fig. 2) preferably of the fluorescent type. The lamps L are enclosed in a lamp housing 45 which is suspended beneath the table 32. A slotted aperture A' is positioned at the apex of the enclosed legs where it is in vertical alignment with the table aperture A.

As the sheet of subject copy is moved over the illuminated aperture A, the image thereof is reflected by a stationary mirror 92 (Fig. 2) pivotally mounted in a bracket 94 which is attached to the base 20 by means of cap screws 96. The relative position of the mirror is adjustable by means of a screw 98, which operates against the biasing force exerted by a spring 99 so that the light rays from the aperture A are directed through a converging lens system 100 which is also mounted in the bracket 94.

The converging lens system 100, which is of conventional design, focuses the light rays upon two aperture members which define the dimensions of the scanning spot as will appear hereinafter. The first aperture member is linear comprising a plate 102 having a horizontally disposed elongated slot. Cemented or otherwise secured to the rear face of the plate 102 is an opaque photographic film 104, whereupon is developed a transparent straight line having a width of approximately 0.002 inch, which being located adjacent the slot in the plate defines an elongated optical aperture. The aperture plate 102 is held in two grooved guides 106 which are attached respectively to two end walls 108 and 109 of a housing designated generally by the numeral 110.

The housing 110 is closed by a sheet metal cover 113 and secured to the base 20 by means of screws 112. Cast as an integral portion of the housing 110 is base plate 114 (Fig. 1) whereupon is secured a cast cover 116 by means of screws (not shown). Enclosed within the cover 116 is a photoelectric cell such as the phototube P whose function will be described in detail hereinafter.

A second aperture, helical in shape, is developed as a 0.003 line upon an opaque photographic film 120 which is arranged about the periphery of a cylindrical aperture member such as the drum 122 (Fig. 2) of a transparent material such as glass or a suitable plastic. One end of the drum 122 is supported by a head 124 having a cylindrical portion with a plurality of axially disposed slots which permit the cylindrical portion to be inserted within the end of the drum with a snug fit. The cylindrical portion has an integral shaft, which engages the inner race of a ball bearing 126 (Fig. 1). The outer race of the bearing 126 fits in a recess in a retaining plate 128 which is secured to the housing end 108 by means of screws 130. The plate 128 also supports a driving motor Md for the drum 122, the motor shaft engaging a recess in the end of the drum shaft supported by the bearing 126. Relative movement between the shafts is prevented by means of a set screw 132.

The opposite end of the drum 122 is supported by a sleeve 134 which is provided with a plurality of axial slots so that it can be slipped over the outside of the drum. The outer surface of the sleeve 134 is ground to fit the inner race of a large ball bearing 136 whose outer race is seated in a recess in the housing end 109.

The bearings 126 and 136 are located so that the axis of rotation of the drum 122 is in the horizontal plane which passes through the linear aperture of the plate 102 and the optical axis of the lens system 100. As the drum 122 is rotated by the motor Md, the helical aperture carried thereby moves behind the linear aperture in a lengthwise direction so that light from sequentially exposed elemental areas of the transverse element of the subject copy exposed by the longitudinal slot A in the copy table surface 34 are admitted to the interior of the drum, i. e., the linear and helical apertures define the dimensions of a scanning spot which is moved across the copy.

To prevent the loss of definition the clearance between the helical and linear apertures is minimized by positioning the aperture defining films 120 and 104 respectively upon the outer surface of the drum 122, and the back or inner face of the plate 102, as has been described heretofore, it is possible to reduce this clearance to approximately 0.004 inch.

To permit the mounting of the photoelectric tube P outside the drum 122 and the use of a longer linear aperture, the light rays are directed through a light conductor 140 of a sheet material, such as methyl methacrylate resin having a high index of refraction. The shape of the light conductor 140 is best shown in Figs. 3, 4 and 5, wherein 142 and 144 designate respectively the light entering and emerging edges thereof. A third edge 146 is in the form of a reflecting surface generated, for example by moving a linear element along a concave curve such as an ellipse. To increase the reflecting properties of the elliptical edge 146 it is lacquered and a brilliant reflecting surface of silver deposited thereupon.

The operation of the light conductor will be more apparent from a consideration of Fig. 4 wherein is shown a development of the conductor and one of the foci F of the elliptical edge 146. It will be apparent from the geometry of the figure that light rays from an object placed at the other focus of the ellipse, which is not shown, will enter the edge 142, be reflected by the elliptical edge 146, and emerge from the edge 144 to form an image at the focus F. Further, when the light conductor 140 is folded about an axis substantially parallel to the entering edge 142 as shown in Figs. 5 and 6, with the radius of curvature of the bent portion made great enough so that the angle of incidence of the light rays exceeds the critical angle of the material, light rays from an object located at a position corresponding to the position of the focus of the ellipse after the bending of the light conductor will continue to be reflected to form an image at the focus F. From the above it follows that by proportioning the axis of the ellipse and the bend in the light conductor 140 so that the lens 100 and the collector electrode of the photoelectric tube P are located at the respective foci, any light emerging from the lens and forming the image of subject copy appearing in the slot A will pass through the apertures, be reflected and conducted by the light conductor 140 and impinge upon the tube P.

The light conductor 140 is supported by means of two straps 148 and 150 which are located respectively upon opposite surfaces of the light conductor adjacent the elliptical edge 146, the conductor being clamped between the straps by means of screws 152. As is best shown in Fig. 6, the straps 148 and 150 are bent back to attach to a ring 154 by means of screws 156. The ring 154 is provided with several offset tabs which are attached to the housing end 109 by means of screws 158 so that the end of the light conductor 140 projects into the drum 122 with its entering edge 142 opposite the linear aperture in the plate 102 and its emerging edge adjacent the photoelectric tube P.

Scanning is accomplished by moving the copy over the table surface 34 past the elongated slot A by means of the two pair of rolls 56 and 62 which are operated by the motor M, as was described heretofore, so that successive transverse elements of the copy are exposed through the slot. The light rays from the lamps L brightly illuminate the element of the copy appearing at the slot so that it is imaged upon the slot in linear aperture plate 102 by the mirror 92. The drum 122 shields the light conductor 140 from the reflected light rays except for those forming a small spot passing through the helical slot in the drum to impinge upon the entering edge 142 of the light conductor 140 whereby the rays are directed to the collector electrode of the photoelectric tube P as has been described in detail heretofore. Rotation of the drum 122 results in the equivalent of the movement of the spot of light across the entering edge 142 of the light conductor as the helical slot rotates so that the photelectric tube P "sees" successive elemental area of the subject copy exposed by the slot A. By correlating the rate of advance of the copy with the speed of rotation of the drum 122, sequential elements of the subject copy are successively traversed by the spot, i. e., the copy is scanned line by line.

It should be understood that the present disclosure is for the purpose of illustration only and that this invention includes all modifications and equivalents which fall within the scope of the appended claims.

I claim:

1. Optical scanning apparatus for a subject copy comprising a light-sensitive device responsive to variations in light intensity, means for scanning the copy point by point along a line including a lens for focusing an image of the scanned line in a plane between the copy and said device and a plate of light-conducting material having a high index of refraction, the plate having a light-entering edge facing said lens to receive the light from the line image focused thereby, a light-emerging edge angularly related to the light-entering edge and an intermediate elliptical reflecting edge having one focus at said lens and the other focus at said device, said plate being folded and the radius of curvature of the fold being such that the angle of incidence of the internally-reflected light exceeds the critical angle of the material, whereby light from said line image is uniformly collected on said device substantially without loss.

2. Optical scanning apparatus for a subject copy comprising a light-sensitive device responsive to variations in light intensity, a lens for focusing light rays from an element of the copy on an image plane, said system including a drum having a helically shaped aperture and a plate having a linear aperture arranged parallel to the axis of the drum adjacent the periphery thereof, said apertures being interposed in the optical path of the light rays between the copy and the light-sensitive device substantially in said image plane, and means for rotating the drum so that selected elemental areas of the copy whose dimensions are determined by the apertures are successively transmitted to the device, and in said drum a plate of light-conducting material having a high index of refraction, the plate having a light-entering edge juxtaposed to and facing said linear aperture, a light-emerging edge facing one end of the drum and an intermediate elliptical reflecting edge having one focus at said lens and the other focus at said device, said device being located outside said end of the drum, said plate being folded for insertion in the drum, and the radius of curvature of the fold being such that the angle of incidence of the internally-reflected light exceeds the critical angle of the material whereby light transmitted from said lens through said linear aperture is uniformly collected on said device substantially without loss.

3. For collecting light from a linear light source a light conductor comprising a plate of light conducting material having a relatively high index of refraction, one edge of said plate forming a curve having two foci, two other edges of said plate being polished to form a substantially recilinear light-entering edge, said two edges being disposed between said curvilinear edge and said foci respectively, and said plate being folded about an axis extending substantially parallel to one of said two edges whereby light from one of said foci entering at points along said entering edge is reflected by said curvilinear edge out the other edge and collected at the other of said foci substantially without loss.

References Cited in the file of this patent

UNITED STATES PATENTS

| | | |
|---|---|---|
| 1,762,383 | Booraem | June 10, 1930 |
| 1,976,270 | Urfer | Oct. 9, 1934 |
| 2,287,605 | Dickson | June 23, 1942 |
| 2,376,448 | Neugass | May 22, 1945 |
| 2,404,627 | Goldberg | July 23, 1946 |
| 2,510,200 | Thompson | June 6, 1950 |
| 2,514,619 | Anderson | July 11, 1950 |
| 2,639,322 | Young | May 19, 1953 |
| 2,770,712 | Dros | Nov. 13, 1956 |